United States Patent [19]

Farello

[11] 3,842,951

[45] Oct. 22, 1974

[54] TWO WAY AUTOMATIC BRAKE ADJUSTER

[75] Inventor: Luciano Farello, Turin, Italy

[73] Assignee: Wabsco Westinghouse S.P.A., Turin, Italy

[22] Filed: Dec. 10, 1973

[21] Appl. No.: 423,600

[52] U.S. Cl. ............................ 188/202, 188/196 D
[51] Int. Cl. ........................................... F16d 65/66
[58] Field of Search ................ 188/196 D, 202, 203

[56] References Cited
UNITED STATES PATENTS
2,824,628  2/1958  Browall .......................... 188/196 D
3,520,387  7/1970  Natschke ............................ 188/202

Primary Examiner—Duane A. Reger
Attorney, Agent, or Firm—Ladas, Parry, Von Gehr, Goldsmith & Deschamps

[57] ABSTRACT

A single nut type brake adjuster of the double acting type in which the adjuster is equipped with an outer rotatable casing, and the main spring, screw housing member, casing, and overtravel spring are arranged so that when the adjuster is in its riding position, the adjuster nut can be adjusted relative to the adjuster screw member by manually rotating the casing.

8 Claims, 9 Drawing Figures

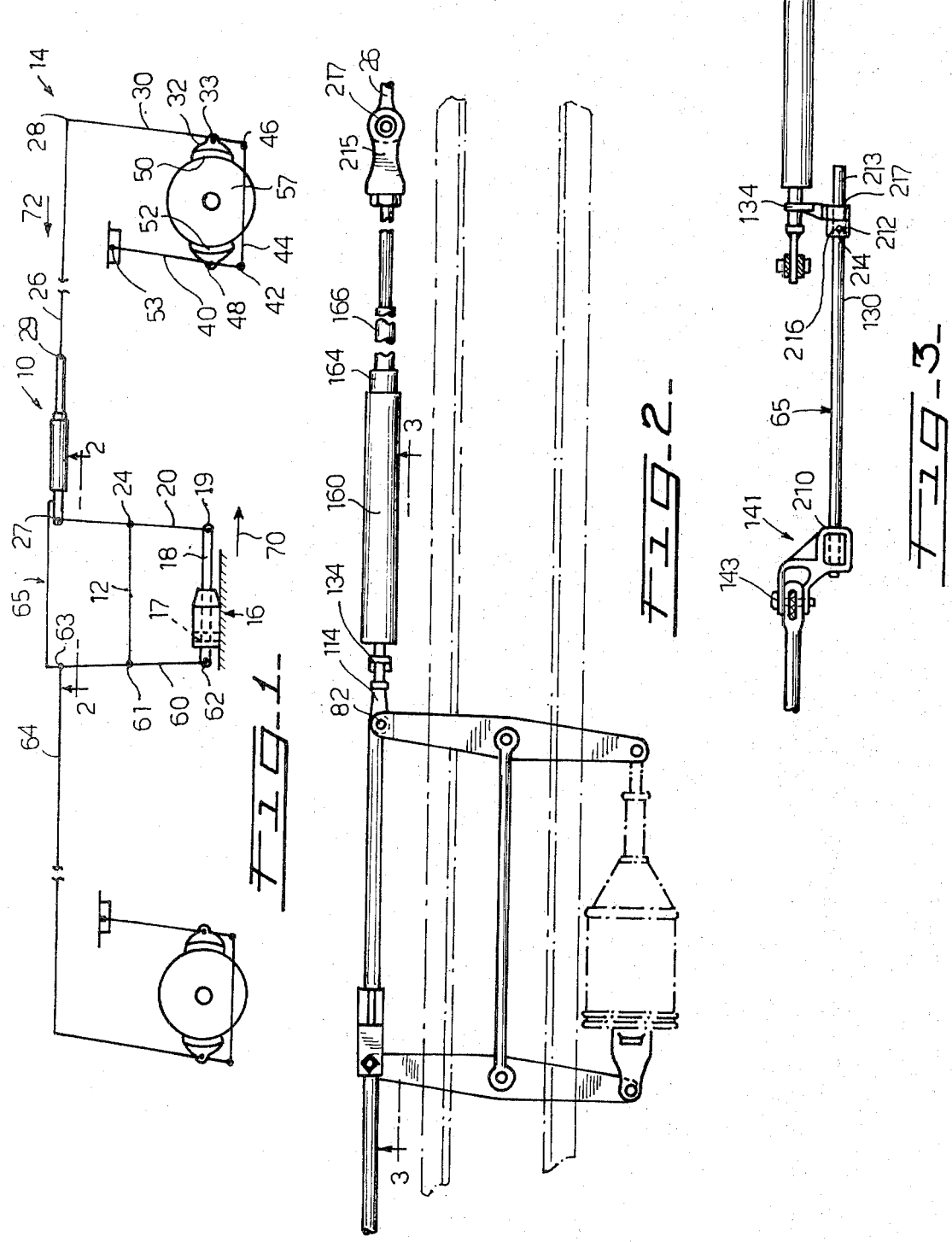

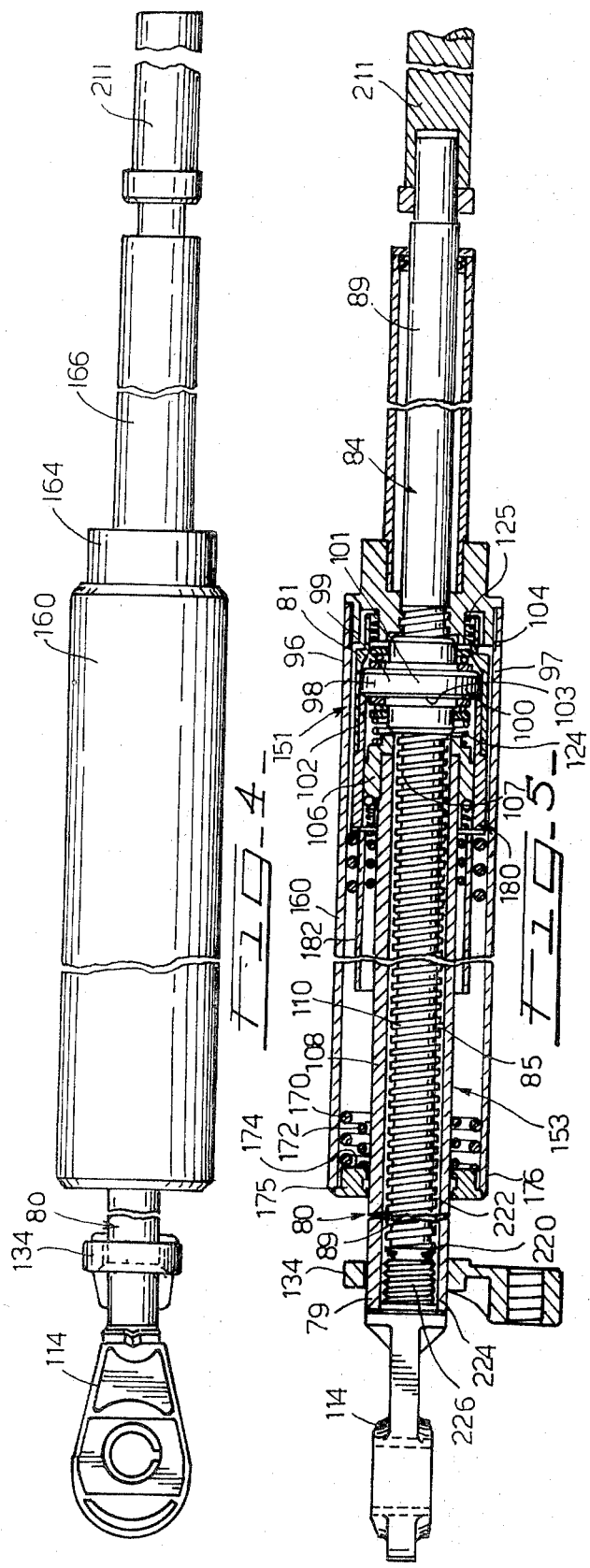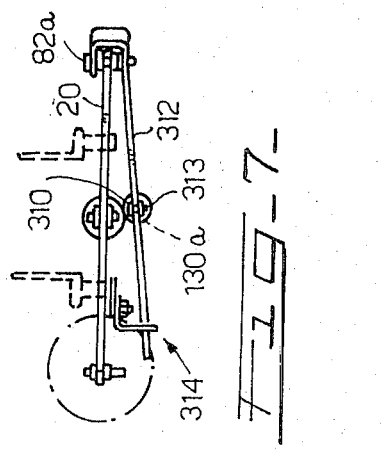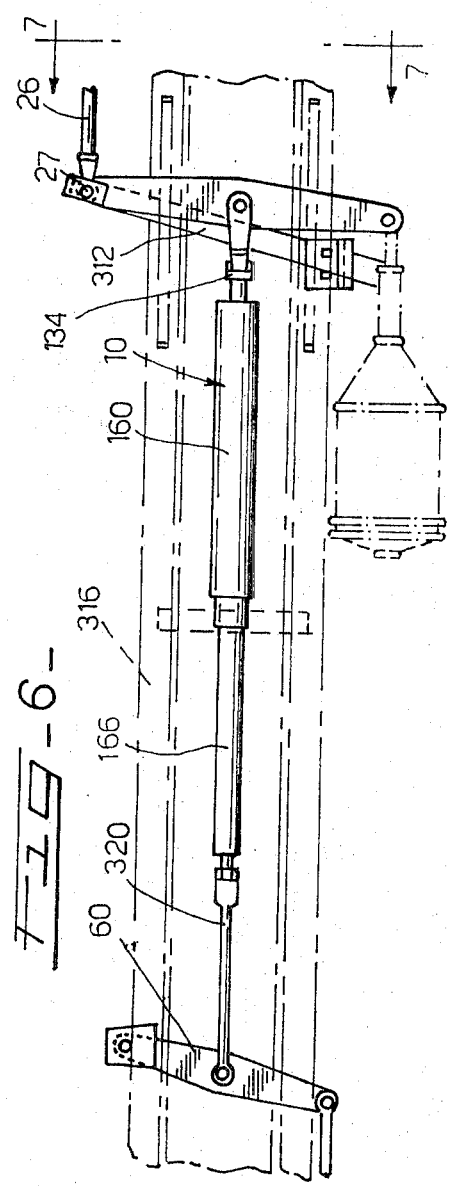

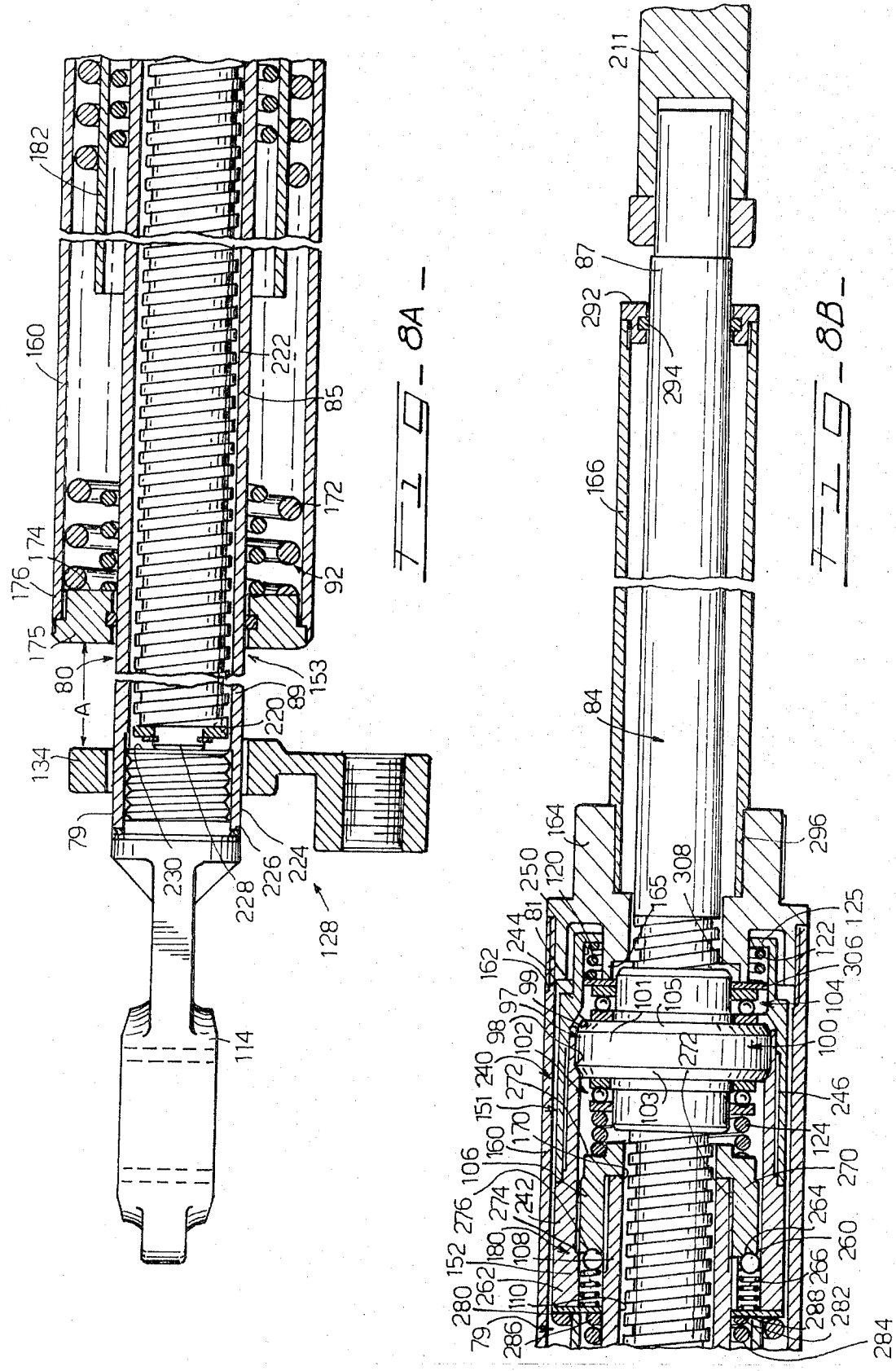

3,842,951

TWO WAY AUTOMATIC BRAKE ADJUSTER

BACKGROUND OF THE INVENTION

This invention relates to a two way automatic brake adjuster for railroad cars, and more particularly, to adjusters for automatically taking up and letting out slack in the brake rigging of a railroad car for insuring that the brake cylinder of the brake rigging has a power stroke that remains approximately the same length for each operation of the car brake system.

Brake adjusters of the type shown in U.S.A. Pat. Nos. 3,177,985 and 3,520,387 employ a single nut operation on a threaded rod in conjunction with slack let out and take up springs that function to automatically let out and take up slack as required during each operation of the brake rigging under the control of a trigger mechanism that is arranged to set up the adjuster for slack let out and take up operation during operation of the car brakes.

Adjusters of this type have the advantage of quickly and safely making complete adjustment of the slack that may be required during the first braking cycle after the need for the slack adjustment has arisen, as for instance, by replacement or loss of brake shoes.

A principal object of this invention is to provide a single nut adjuster of the general type indicated wherein manual adjustment of the adjuster is available, in addition to automatic two way adjustment that is available on brake stroke operation.

Another principal object of the invention is to provide a single nut adjuster of the general type indicated that is provided with an encompassing casing arrangement that does not interfere with the basic two way automatic function of the adjuster, and provides a convenient purchase on the adjuster for making manual adjustment of the adjuster.

SUMMARY OF THE INVENTION

In accordance with the present invention there is provided a single nut type brake adjuster adapted to form a part of a railroad car brake rigging as a force transmitting device, and including a rod member provided with a screw portion at one end thereof and means adjacent the other end thereof for securing same into the rigging, a housing member mounted in telescoping relation to the rod member screw portion at one end thereof and including means adjacent the other end thereof for securing same into the rigging, resilient means for biasing said members in a slack take up direction from an extended relation to a contracted relation in which said rod member is withdrawn inside said housing member a suitable amount, a nut threadedly received on said screw portion of said rod member and disposed within a portion of said housing member, said housing member portion carrying a stop clutch assembly including spaced seats adapted to be engaged by opposing clutch surfaces of said nut, and means for actuating said nut during operation of the brake rigging to rotate in slack take up and let out directions as required to maintain the stroke of the rigging brake cylinder of substantially uniform length, including slack take up controlling means comprising an actuator including a member mounted on said housing member for relative shifting movement therebetween and longitudinally thereof in response to brake cylinder overtravel, and means for utilizing said relative shifting movement to effect biasing of said nut to rotate in a slack take up direction, wherein:

said housing member portion is secured to said other end portion thereof for rotational movement relative thereto, a rotatable casing received over said housing member portion for shifting movement longitudinally of the adjuster and extending over said rod member at one end of said casing and over said housing member one end at the other end of said casing, said resilient means engaging between said housing member portion and said casing for frictionally keying them together for rotation in unison, said casing including an abutment structure for acting on said nut under the biasing action of said resilient means to draw said nut against one of said seats to preclude rotation thereof with respect to said rod member in the riding relation of the adjuster, a take up compression spring interposed between said housing member one end and said nut, with said nut being biased against one of said seats by said resilient means in the riding relation of the adjuster, said utilizing means comprising said actuator member being applied to said casing other end in response to brake cylinder overtravel to shift said casing to relieve said nut of the biasing action of said resilient means whereby said compression spring is operative to rotate said nut in a slack take up direction, said nut being drawn against the other of said seats to transmit thrust force through said adjuster on application of forces to said adjuster in opposition to said resilient means, whereby, in the riding relation of said adjuster said nut, said housing member portion and said casing are locked together as one rotatable unit relative to said rod member, and manual rotation of said casing will rotate said nut relative to said rod member to adjust the position of said nut relative to said rod member, and no operation of said actuator member on brake cylinder overtravel, said resilient means acts as an overtravel springs.

BRIEF DESCRIPTION OF THE DRAWINGS

Still other objects, uses and advantages will be obvious or become apparent from a consideration of the following detailed description and the application drawings.

In the drawings:

FIG. 1 is a diagrammatic largely schematic view illustrating a typical brake rigging arrangement to which the brake adjuster of this invention has been applied to a top rod application;

FIG. 2 is a plan view of the adjuster shown in its top rod application in a more specific, but diagrammatically illustrated, form, and on an enlarged scale;

FIG. 3 is a view substantially along line 3—3 of FIG. 2;

FIG. 4 is a plan view of the adjuster itself on an enlarged scale, showing the adjuster in its fully contracted form;

FIG. 5 is a vertical sectional view through the adjuster shown in FIG. 4, with parts shown in elevation;

FIG. 6 is a view similar to that of FIG. 2, but showing center rod application of the adjuster shown in FIGS. 4 and 5;

FIG. 7 is a fragmental sectional view taken substantially along line 7—7 of FIG. 6; and FIGS. 8A and 8B when considered together comprise a composite longitudinal vertical sectional view similar to that of FIG. 5 but on an enlarged scale.

However, it is to be distinctly understood that the specific drawing illustrations provided are supplied primarily to comply with the requirements of the Patent Law, and that the invention may have other embodiments which will be obvious to those skilled in the art and which are intended to be covered by the appended claims.

DETAILED DESCRIPTION OF THE INVENTION

Referring first to FIG. 1, reference numeral 10 generally indicates a diagrammatically illustrated embodiment of this invention in top rod application as part of an otherwise diagrammatically illustrated conventional brake rigging that is generally indicated by reference numeral 14.

The brake rigging 14 that is illustrated is for single axle trucks and comprises the customary air actuated brake cylinder 16 that is secured to the car in any suitable manner and includes a piston 17 that actuates thrust or piston rod 18 which is pivotally connected as at 19 to cylinder or live lever 20 which in turn is pivotally connected to a center rod 12, as at 24, and a connecting rod 26, as at 27, that extends to one of the car trucks, where the rod 26 may be pivotally connected as at 28 to the truck actuating lever 30 that is pivotally connected to one of the brake beams 32 as at 33 and is pivotally connected to a truck dead lever 40 by a link 44 connected between the two by pivotal connections 42 and 46. The dead lever 40 is connected to the other brake beam 32 as at 48, and the two brake beams 32 at each truck carry diagrammatically illustrated brake shoes 50 and 52. Dead lever 40 is pivotally connected to the car as at 53.

In the brake rigging 14 that is illustrated, the adjuster 10 is applied between the connecting rod 26 and the cylinder live lever 20, with the cylinder live lever 20 being connected to the adjuster at the pivotal connection 27 and the adjuster being connected to rod 26 at pivotal connection 29.

The rigging center rod 12 is also pivotally connected as at 61 to a dead lever 60 which is fulcrumed in the illustrated embodiment at a pivotal connection 62 that is part of the housing of brake cylinder 16, with the other end of the dead lever 60 being pivotally connected to the other connecting rod 64 as at 63, which is in turn connected to the truck brake apparatus of the other car truck in a manner similar to that shown at the right hand side of FIG. 1, as shown in the drawing.

The adjuster 10 is controlled by an operating or trigger rod 65 extending between the dead lever pivotal connection connecting rod 63 and the adjuster 10 in the manner more specifically indicated in FIG. 2 and 3.

As is well known in the art, when a braking of the car equipped with rigging 14 is to be effected, the brake cylinder 16 is actuated to move the thrust or piston rod 18 to the right of FIG. 1, or in the direction of the arrow 70, which tends to throw the cylinder lever 20 counterclockwise about the pivotal connection 24 between it and the center rod 12. Likewise, this motion tends to move the connecting rod 26 to the left of FIG. 1 and in the direction of the arrow 72 to swing the truck levers 30 and 40 in a manner to force the brake shoes 50 and 52 against the diagrammatically illustrated truck wheels 57 of the truck at the right hand end of FIF. 1. The connection of the center rod 12 with the dead lever 60 actuates the lever 60, the connecting rod 64, and truck braking apparatus that rod 64 is connected to in a similar manner, so that the brake shoes at the left hand end of the car are applied to the wheels at that end of the car in a simultaneously similar manner.

The brakes are released when air is released from the cylinders 16 in the conventional manner with the result that the weight of the brake beams in their conventional swinging mounting hangers (not shown) swings them away from the respective wheels 57 which causes the connecting rods 26 and 64, the cylinder lever 20, and the dead lever 60, and the brake cylinder thrust or piston rod 18, to move in the directions opposite to those indicated by the arrows 70 and 72.

As is well known in the art, brake shoes tend to wear away during each application of the car brakes, and while the brake shoe wear is not materially noticeable for each braking operation, it is cumulative and causes an increase in the amount of slack created in the rigging as day to day use of the car proceeds. The result is that each time the car brakes are to be applied, the brake levers must be moved just a little further toward the wheel each time in order to secure adequate braking action, which means that a slightly increased amount of movement of the connecting rods 26 and 64, and the thrust or piston rod 18 is required each time the brakes are applied.

The general function served by the brake adjuster of this invention is to consistently maintain the stroke of the brake cylinder at the length prescribed by regulations applicable to brake operation, and to automatically accommodate or effect the rigging slack take up or let out that is involved in providing such results as may be necessary to accommodate normal brake shoe wear and loss or replacement of brake shoes.

The adjuster 10 generally comprises a housing member 80 that is pivotally connected at one end 79 thereof to the cylinder or live lever 20 by a suitable pin 82, which forms the pivotal connection 27. Housing member receives a rod member 84 that includes a threaded section 85 that is received in housing member 80 and and a plain or unthreaded section 89 which is suitably connected to connecting rod 26.

Th housing member 80 includes a friction stop clutch assembly of the type disclosed in said U.S. Pats., and generally indicated by reference numeral 96, which includes a pair of annular stops or seats 98 and 99 that are in spaced apart relation within the housing member 80. Operating in the stop clutch space 97 between the two seats 98 and 99 within the housing 80 and on the threaded section 85 of the rod member 84 is a nut device 100 that in the form illustrated includes nut 101 provided with thrust bearing assemblies 102 and 104 on either side of same (see FIGS. 5 and 8B). Nut 101 is formed with frusto-conical clutch surfaces 103 and 105 on either side of same.

The housing member 80 adjacent the stop clutch assembly 96 defines a hub portion 106, provided with a central opening 107, that is secured to tube 108 defining a bore 110 in which the threaded section 85 of the rod member 84 is adapted to be received.

The housing member 80 at the end of its tube 108 is provided with an eye member 114 adapted for pivotal connection with the cylinder lever 20. Housing member 80 at its other end 81 forms the clutch space 97. Main spring means 92 is received over the housing member in concentric relation thereto between the ends 79 and 81 thereof.

Cooperating with the nut device 100 on one side of same is a slack pay out or let out spring 120 which is interposed between the thrust bearing assembly 104 and a spring seat 122 formed on flange 125 of housing 80. On the other side of the nut 102, thrust bearing assembly 102 is to be engaged by a slack take up compression spring 124 interposed between the assembly 102 and housing member hub portion 106. Operably associated with the housing member 80 is the slack take up control assembly 128, for purposes of controlling the slack take up and let out functions of the adjuster.

The control assembly 128 includes thrust member 134 shiftably mounted on housing member tube 108 and adapted for securement to connecting rod 130 (see FIGS. 2 and 3) that forms the trigger rod 65 in the specific arrangement of FIGS. 2 and 3. The connecting rod 130 is provided with a suitable clevis structure 141 for connection to pin 143 which forms the rigging pivotal connection 63 in the specific form of FIGs. 2 and 3.

The position of the thrust member 134 define the quote A (see FIG. 8A); this quote is established in such a way as to correspond to the shoe stroke when the shoe-wheel clearances are normal.

Therefore, the quote A is the reference element for every shoe-wheel clearances change, so the regulator records the change and take the shoe-wheel clearances to the normal conditions.

As described in said U.S. Pats., the threading 146 of the threaded section of rod member 84 should be such that when the nut device 100 is free to rotate and is biased toward the right of FIGS. 1, 2, 4 and 5 of the drawings, the nut device 100 (when unseated) will rotate in the direction to move the rod member 4 to the left (in the slack take up direction) relative to the housing member 80, which may be designated the nut slack take up rotational direction.

The slack let out spring 124 biases nut device for rotation in the opposite direction, which may be designated the nut slack let out direction.

In accordance with this invention, housing member 80 has associated with its tube 108 a rotatable part or section 151 in which are formed the seats 98 and 99, and spring seat 124. Rotatable part 151 includes a hub portion 152 adapted for engagement with the hub portion 106 of member 80 for applying longitudinal forces on the adjuster tending to draw the housing member 80 away from the rod member 84. The portion of housing member 80 that is fixed relative to clevis 114 may be termed its fixed part 153.

The rotatable part 151 rotates only in the manual operation while for the automatic adjustments, the movement is telescopic.

The slack control assembly 128 includes an elongate casing or barrel 160 received over and substantially enclosing housing member 80 and carrying at its end 162 an end member 164 to which is secured elongate shielding sleeve 166 that is received concentrically about rod member 84. ENd member 164 includes annular abutment structure 165 which bears against bearing unit 104 under the action of the main spring means 92, which in the form shown comprises two concentrically arranged high strength compression springs 170 and 172. Springs 170 and 172 seat against spring seat 174 formed by end cap 175 that is fixed to the end 176 of casing 160, and also against spring seat structure 179 that bears against hub portion 152 of the housing member rotatable part 151.

Operably interposed between the housing member fixed and movable parts is ball type snap lock device 180 (see FIGS. 5 and 8B).

The take up control assembly 128 functionally includes the springs 170 and 172, which in addition to providing the main spring means, also serve as the overtravel spring means of adjuster 10. Sleeve 182 that is seated against seat structure 179 limits the permissible movement of the eyelet element 114 under the action of the lever 20 in the direction that would compress spring means 92.

The compression springs 170 an 172 act to seat nut 101 against stop clutch surface 98 by seating abutment structure 165 against the nut thrust bearing device 104, in the riding position of the adjuster.

Assuming that the adjuster 10 is applied in place (in the top rod application of FIGS. 1 and 2) in its fully contracted relation that is shown in the drawings, reaction of the high strength compression spring means 92 tends to hold nut device 100 against seat 98 of the stop clutch assembly 96. In addition, the lock device 180 releasably locks the movable part 151 of the housing member 80 with respect to its fixed part 153, thereby preventing any extension and contraction of the brake adjuster.

When the brakes are initially set or applied by activating the brake cylinder 16 in the usual manner, the connecting rod 26 goes under tension, and relative movement occurs between the housing member 80 and the rod member 84 that tends to compress the spring means 92 by the action of the nut device 100 being drawn against abutment structure 165. This action continues until the strenght of the springs 170 and 172 is overcome to the extent that the nut device 100, which is carried by the rod member 84, separates from its stop seat 98 and starts to move in the direction of stop seat 99 (relative to the housing member 80).

Since it has been assumed that the brake adjuster 10 has been applied to the brake rigging in its fully contracted relation, there will be insufficient slack in the riggint to permit the brake cylinder stroke that is desired.

However, the springs 170 and 172 once the power stroke has proceeded to the point where the nut 101 is freed from seat 98, apply a bias to the nut device 100 tending to turn the nut in its slack let out direction, and act on the nut 101 through abutment structure 165. Under these conditions, the casing 160 will be short of its normal position relative to the thrust member 134 when the brake shoes are applied to the car wheels, with the result that the nut device 100 will turn in its slack let out direction until the casing end cap 175 engages the thrust member 134. The relative strenght of the pay out spring 120 which must only maintain in position the thrust bearing device 104 (as assisted by the main springs) and take up spring 124 are proportioned such that when the casing 160 is spaced from thrust member 134 and the nut is separated from the seat 98 by the brake power stroke, the spring means 92 rotate the nut device 100 in the direction indicated against the action of the take up spring 124. When the casing end cap 175 engages the thrust member 134, the adjuster will be set to provide the desired brake cylinder stroke (assuming member 134 has been previously set to the desired position).

The initial brake power stroke is completed by the nut device being drawn against the clutch stop seat 99 so that the full brake cylinder thrust forces are applied through the brake adjuster in the usual manner. On release of the brakes the adjuster returns to its riding relation, except that rod member 84 will be disposed relative to housing member 80 to provide the desired slack in the rigging.

Alternately, the casing 160 may be rotated manually to give the desired adjuster setting prior to applying same to the rigging 14. This is because, in accordance with this invention, when manual adjustment of the nut device 100 is desired, it is merely necessary to manually rotate the casing 160 in the direction necessary to effect the result desired. Since the spring means 92 frictionally keys together the casing 160 and the housing member rotatable part 151, manual rotation of the casing 160 will rotate the nut 100 relative to the screw member 84. The lock device 180 is arranged to snap into and out of locking relation to permit the desired manual rotation of the casing 160. To manually set the adjuster it is merely necessary to rotate casing 160 in the direction necessary to extend the adjuster the desired amount.

The operation of the brake adjuster for slack take up purposes is as follows: When the brakes are applied, the housing member 80 and the rod member 84 are moved relatively to compress the spring means 92 and move the nut device in the direction of stop seat 99. In the meantime, the differential motion of the slack take up assembly 128 results in the casing 160 moving toward the thrust member 134 (assuming the top rod application of members 1 - 3 is employed, in which thrust member 134 is stationary), until the casing end cap 175 engages the thrust member 134. AS the brake stroke proceeds, the casing 160 thereafter remains stationary for the remainder of the power stroke with housing member 84 moving to the left of FIGS. 5 and 8A and 8B (relative to the casing 160), whereby the pressure of the abutment structure 165 acting on the nut device 100 is relieved. As the power stroke further proceeds, the nut 101 separates from seat 98, with take up compression spring 124 being effective to rotate the nut device in the take up direction, when the nut device is between seats 98 and 99 against the action of relatively weak spring 120, since the nut is not now subject to the bias of the main springs 170 and 172. After the nut device 100 engages the seat 99, the brake stroke continues to completion to apply the full thrust of the brake cylinder through the brake shoes. In the meantime, movement of the housing member 80 to the left, which effects further differential movement of same relative to the casing 160, whereby the main spring means 92 is functioning in an overtravel manner.

After the power stroke is completed, the air is released from the brake cylinder and the tension in the rigging disappears, thereby permitting the brake beams 32 to swing away somewhat from the wheels 57. Nut 101 separates from seat 99, and prior to engagement of abutment 165 with bearing unit 104, the take up spring 124 effects further rotation of the nut device in its slack take up direction. As housing member 80 returns to the right of FIGS. 5 and 8A and 8B, the main springs 170 and 172 reseat abutment 165 against bearing unit 104, which results in nut 101 being reseated against seat 98 as casing 160 separates from thrust member 134. The spring means 92 thus draw the nut device 100 (through abutment structure 165) against the seal 98 of the stop clutch assembly 96 to set the brake adjuster in its riding position.

When the brake shoe wear has proceeded to the point where replacement of the shoes is required, the shoes are replaced in the usual manner, with casing 160 being rotated in the direction to move nut device 100 relative to rod member 84 to separate the brake shoes from the wheels, as may be required to apply the new shoes. On the first application of the brakes after replacement of the shoes, the brake adjuster lets out slack in the manner already indicated.

As indicated, when manual adjustment of the nut device 100 is desired, it is merely necessary to manually rotate the casing 160 in the direction necessary to effect the result desired.

The lock device 180 serves the important function of holding the casing 160 in its adjusted position after adjustment has taken place, when the car is subjected to end impacts. This function is especially important when the car brakes are released and the car is impacted. The lock device 180 is thus arranged to permit ready rotation of the casing 160 for manual adjustment, but yet have sufficient locking function to resist tendencies to rotate when the car is impacted.

The brake rigging 14 in which the adjuster 10 is incorporated may be of any conventional type. The brake cylinder 16 and dead levers as well as the levers and linkage for actuating the brake beams may be mounted and interconnected in any suitable manner to serve the conventional functions of brake rigging. Also, the brake cylinder 16 may be of any conventional type having the general arrangement indicated.

The control or trigger rod in the specific top rod application shown in FIGS. 2 and 3 comprises the connecting rod 130 suitably affixed to the clevis structure 141, as by welding at 210.

The connecting rod 130 in the form shown in FIGS. 2 and 3 carries the sleeve 212 provided with a set screw 214 for setting the position of the sleeve 212 after the adjuster has been mounted in position in the rigging to permit the rigging to be adjusted so that the brake cylinder will have the desired stroke with new brake shoes in place, with, of course, thrust member 134 received over the end 213 of rod member 130 and against sleeve 212. When this relative positioning of the sleeve 212 and thrust member 134 with respect to the connecting or trigger rod 65 has been determined, the sleeve 212 is welded in place as at 216, and thrust member 134 is suitably fixed in place as by welding 217.

Rod member 84 has its end 87 suitably connected into the rigging, as by applying suitable adaptor 211 thereto carrying suitable clevis 215 thereto that is connected to connecting rod 26 by suitable pin 217 forming connection 29, an the other end 89 or rod member 84 is equipped with a suitable bearing 220 for guiding relation with the inner surface 222 of extension 108.

The end 224 of the housing member tube 108 is closed by the application thereof of eye member 114, which is provided with an externally threaded stud 226 for this purpose. In the full contracted position of the adjuster, the terminal portion 228 of the rod member 84 seats against the end 230 of stud portion 226.

The application of eye member 114 to brake cylinder lever 20 and pin 82 secures this member against rotation relative to the cylinder lever and rod member 84. Eye member 114 is suitably fixed against rotation relative to housing member 84.

The rotatable part 151 of housing member 80 comprises a traction sleeve assembly 240 comprising sleeve elements 242 and 244 (see FIG. 8B) suitably connected together, as by employing the threaded connection indicated at 246. The sleeve element 242 is formed to define the aforementioned hub portion 152 and stop seat 98. Sleeve element 244 is formed to define stop seat 99 and spring chamber 250 in which let out spring 120 is mounted as well as flange 125 and spring seat 122.

The lock device 180 comprises a plurality of locking balls 260 each received in a separate operating bore 262 formed in the housing rotatable part hub portion 152 to extend axially of the assembly 240. The bores 262 may be of any suitable number and preferably are equally spaced about the circumference of the hub portion 152 for alignment with correspondingly located recesses 264 formed in the hub portion 106 of the housing member 84. Compression springs 266 bias the locking balls 260 into operative seating engagement with the respective recesses 264. While the balls and their associated parts may be equal in number to the number of recesses 264, it has been found that a lock device comprising a pair of the balls 260 and their associated parts located 180 degrees apart and alternately cooperating with either four or eight recesses 264 equally spaced about the circumference of hub portion 106 provides the results desired.

The hub portion 106 of housing member 84 comprises a cup element 270 threadedly secured to the housing member tube 108 as at 272 and formed to define the aforementioned central opening 107 as well as spring seat 272 against which one end of the take up spring 124 seats. The recesses 264 are formed in the rim portion 274 of element 270, and as best indicated in FIG. 18, said recesses 264 are formed to define tapered side walls 276 so that the balls 260 are readily cammed out of their seating relation with respect to the recesses 264 to permit manual rotation of the casing 160. Thus, as the casing 160 is manually rotated, the locking balls 260 snap into and out of succeeding recesses 264 in being shifted about the circumference of hub portion 106.

The spring seat structure 179 in the form shown comprises disc 280 seated on the end of the rotatable part hub portion 152 over the bores 262 to serve as a spring seat for the respective springs 266 as well as the outer main spring 172. Disc 280 has seated thereagainst ring member 282 which defines the spring seat 284 for the inner main springs 170 at this area of the adjuster. Suitable locking ring 286 seated in recess 288 formed in the housing member tube 108 limits movement of the disc 280 relative to the housing member 84 for assembly purposes, under the action of springs 266 of lock device 180.

The extension 166 of casing 160 has an end cap 292 affixed thereto equipped with a suitable seal 294 in sliding relation with the rod member 84; the sleeve member 166 at its other end 296 is received within the end member 164.

The pay out spring 120 at its end adjacent the bearing unit 104 seats against spring seat 306 which in turn seats against the bearing unit 104. The annual abutment structure 165 of the casing end member 164 in the form shown comprises an annular projection 308 which is seated against the spring seat 306 when the adjuster is in its riding position.

In FIGS. 6 and 7, the adjuster 10 is shown in center rod application, wherein the adjuster 10 replaces the center rod 12 in the manner indicated in said U.S. Pats., and the connecting rod 130 A, which corresponds to rod 130 of FIGS. 2 and 3, is provided with a clevis 310 for pivotal connection to operating or trigger lever 312 (by suitable pin 313) that is connected between the cylinder lever 20 pivotal connection 27 (formed by pin 82A), and a bracket structure 314, in the manner disclosed in said U.S. Pats., to control the slack let out and take up functions of the adjuster 10.

Connecting rod 26 in the center rod application is thus connected directly to cylinder lever 20 at pin 82 A and rod member 84 is shown connected to dead lever 60 by suitable fitting 320. Dead lever 60 has the usual type of mounting and tie rod connection relation indicated in FIG. 6 for a center rod application. In the center rod application of adjuster 10, thrust member 134 is moved by trigger lever 312 relative to casing 160.

Under normal riding conditions, the main springs 170 and 172 comprising main spring means 92 maintain nut 101 against stop seat 98 and abutment structure 165 against the nut thrust bearing 104. In the showing of FIGS. 4, 5, 8A, and 8B, the rod member is shown fully withdrawn within the housing member 80, which is the condition in which the adjuster is ordinarily supplied for application to the car. By turning the casing 160 manually, the nut device 100 is rotated to feed the rod member 84 outwardly of its housing member 80 as may be necessary or desirable to apply the device to the car. As installed, thrust member 134 should be spaced approximately the distance A from casing end cap 175 (see FIG. 8A).

The lock device 180 is arranged so that locking balls 260 are seated in place with sufficient force that application of a hand tool or the like to casing 160 is not necessary to rotate same for manual adjustment of the adjuster.

In the forms illustrated, the cylinder lever 20, dead lever 60 and trigger lever 66 are supported from the car center sill 316 through the diagrammatically illustrated support brackets or other suitable means.

Operation of the adjuster 10 in center rod application is similar to that described for top rod application except that thrust member 134 is moved by trigger lever 312 to provide the differential motion desired, as described in said U.S. Pats.

It will therefore be seen that this invention provides the effective and reliable single nut type operation while additionally permitting manual adjustment of the nut by manual rotation of the casing which substantially encloses and protects the adjuster working parts.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a single nut type brake adjuster adapted to form a part of a railroad car brake rigging as a force transmitting device, and including a rod member provided with a screw portion at one end thereof and means adjacent the other end thereof for securing into the rigging, a housing member mounted in telescoping relation to the rod member screw portion at one end thereof and including means adjacent the other end thereof for securing same into the rigging, resilient means for biasing said members in a slack take up direction from an extended relation to a contracted relation in which said rod member is withdrawn inside said housing member a suitable amount, a nut threadedly received on said screw portion of said rod member and disposed within a portion of said housing member, said housing member portion carrying a stop clutch assembly including spaced seats adapted to be engaged by opposing clutch surfaces of said nut, and means for actuating said nut during operation of the brake rigging to rotate in slack take up and let out directions as required to maintain the stroke of the rigging brake cylinder of substantially uniform length, including slack take up controlling means comprising an actuator including a member mounted on said housing member for relative shifting movement therebetween and longitudinally thereof in response to brake cylinder overtravel, and means for utilizing said relative shifting movement to effect biasing of said nut to rotate in a slack take up direction, the improvement wherein:

said housing member portion is secured to said other end portion thereof for rotational movement relative thereto, a rotatable casing received over said housing member portion for shifting movement longitudinally of the adjuster and extending over said rod member at one end of said casing and over said housing member one end at the other end of said casing, said resilient means engaging between said housing member portion and said casing for frictionally keying them together for rotation in unison, said casing including an abutment structure for acting on said nut under the biasing action of said resilient means to draw said nut against one of said seats to preclude rotation thereof with respect to said rod member in the riding relation of the adjuster, a take up compression spring interposed between said housing member one end and said nut, with said nut being biased against one of said seats by said resilient means in the riding relation of the adjuster, said utilizing means comprising said actuator member being applied to said casing other end in response to brake cylinder overtravel to shift said casing to relieve said nut of the biasing action of said resilient means whereby said compression spring is operative to rotate said nut in a slack take up direction, said nut being drawn against the other of said seats to transmit thrust forces through said adjuster on application of forces to said adjuster in opposition to said resilient means, whereby, in the riding relation of said adjuster said nut, said housing member portion and said casing are locked together as one rotatable unit relative to said rod member, and manual rotation of said casing will rotate said nut relative to said rod member to adjust the position of said nut relative to said rod member, and on operation of said actuator member on brake cylinder overtravel, said resilient means acts as an overtravel spring.

2. The adjuster set forth in claim 1 wherein:
said resilient means comprises compression spring means interposed between said housing member portion and said casing other end.

3. The adjuster set forth in claim 1 wherein:
said take up compression spring is in concentric relation to said housing member portion,
and including antifriction means carried by said nut and interposed between same and said compression spring.

4. The adjuster set forth in claim 3 including:
second antifriction means carried by said nut and interposed between same and said abutment structure.

5. The adjuster set forth in claim 1 including:
releasable locking means interposed between said housing member one end and said housing member portion for holding said casing against rotation when said adjuster is in its said riding relation,
said locking means including means for releasing same for accommodating said manual rotation of said casing.

6. The adjuster set forth in claim 5 wherein:
said locking means comprising spring biased detent means cooperating with socket means,
said releasing means comprising cam surfaces concentric with the respective socket means for camming said detent means therefrom on said manual rotation of said casing.

7. The adjuster set forth in claim 1 including:
a let out compression spring interposed between said nut and said one end of said casing for biasing said nut to rotate in a slack let out direction when said nut is in a position intermediate said seats,
said resilient means in said position of said nut, when said actuator member is spaced from said casing, being effective to apply bias to said nut to rotate in the slack let out direction.

8. The adjuster set forth in claim 7 wherein:
said abutment structure is adjacent said one end of said casing, and is in circumambient relation about said rod member,
said let out spring being in concentric relation to said abutment structure.

* * * * *